Jan. 17, 1950

R. W. IRWIN 2,494,558

SPEED-CHANGING GEARED TRANSMISSION FOR
BICYCLES AND OTHER WHEELED VEHICLES

Filed Dec. 9, 1947

INVENTOR.
RUFUS W. IRWIN,
BY
McMorrow, Berman + Davidson
ATTORNEYS.

Jan. 17, 1950 R. W. IRWIN 2,494,558
SPEED-CHANGING GEARED TRANSMISSION FOR
BICYCLES AND OTHER WHEELED VEHICLES
Filed Dec. 9, 1947 2 Sheets-Sheet 2
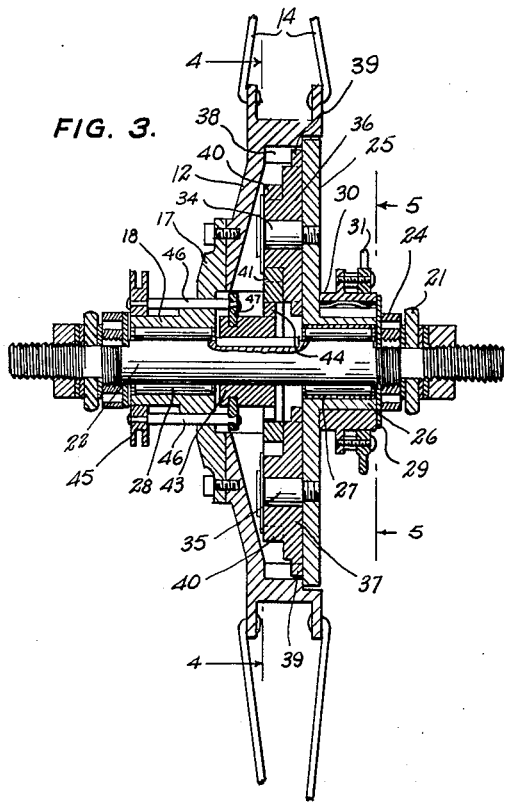
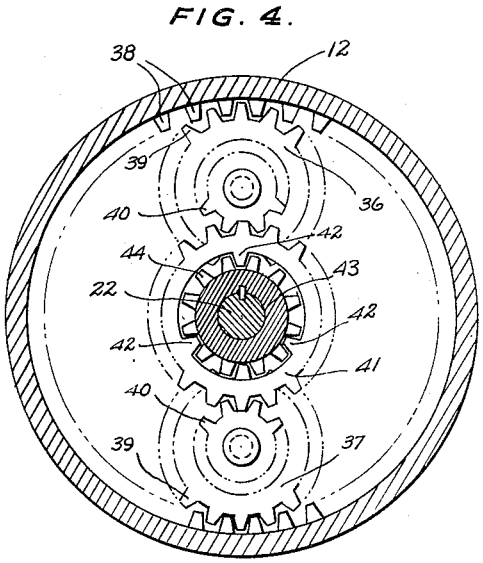
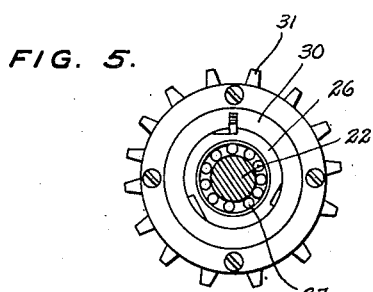
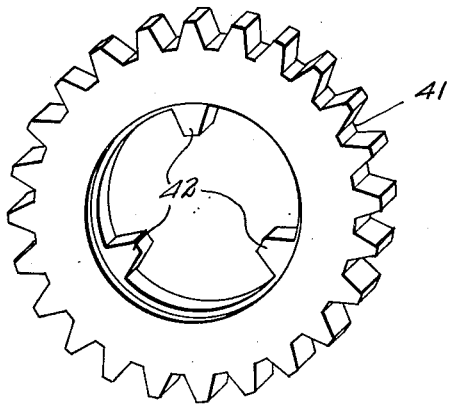
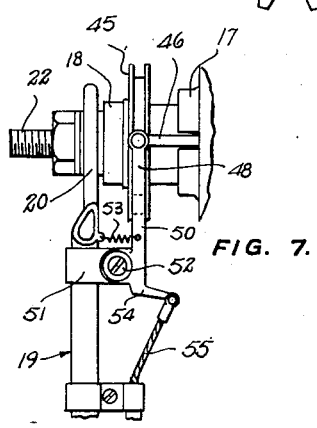
INVENTOR.
RUFUS W. IRWIN,
BY
McMorrow, Berman + Davidson
ATTORNEYS.

Patented Jan. 17, 1950

2,494,558

UNITED STATES PATENT OFFICE 2,494,558

SPEED-CHANGING GEARED TRANSMISSION FOR BICYCLES AND OTHER WHEELED VEHICLES

Rufus W. Irwin, Brownsville, Tex.

Application December 9, 1947, Serial No. 790,634

1 Claim. (Cl. 74—750)

This invention relates to speed-regulating transmisson systems for bicycles and the like, and more particularly to transmissions of the planetary gear type.

A main object of the invention is to provide a novel and improved geared transmission system for bicycles, motorcycles, and similar two-wheeled vehicles, said transmission system providing means for rotating the driving wheel of the vehicle with either high torque at low speed, as when a heavy load is applied to the driving wheel, or with low torque at high speed, as when the vehicle is up to speed or travelling on level ground, whereby the vehicle may be driven with maximum efficiency at all times and with a higher average speed for a given amount of energy input than has heretofore been possible to attain.

A further object of the invention is to provide an improved geared transmission for vehicles of the two-wheeled type or of the type wherein tractive force is applied at a single driving wheel, said transmission being very simple in construction, providing required torque under a wide range of loading conditions, being light in weight, and being very compact in size.

Further objects and advantages of the invention will become apparent from the following description and claim, and from the accompanying drawings, wherein:

Figure 3, is a transverse vertical cross-sectional view taken through the hub portion of the bicycle wheel of Figures 1 and 2.

Figure 4 is a detail cross-sectional view taken on line 4—4 of Figure 3.

Figure 5 is a cross-sectional detail view taken on line 5—5 of Figure 3.

Figure 6 is an enlarged perspective detail view of the intermediate power gear employed in the bicycle transmission system of Figures 1 to 3.

Figure 7 is a fragmentary detail plan view of the outer portion of the wheel hub of the bicycle wheel of Figures 1 and 2 showing the connection of the speed shifting cable to the gear shifting collar as employed in the structure of said Figures 1 and 2.

Figure 1:
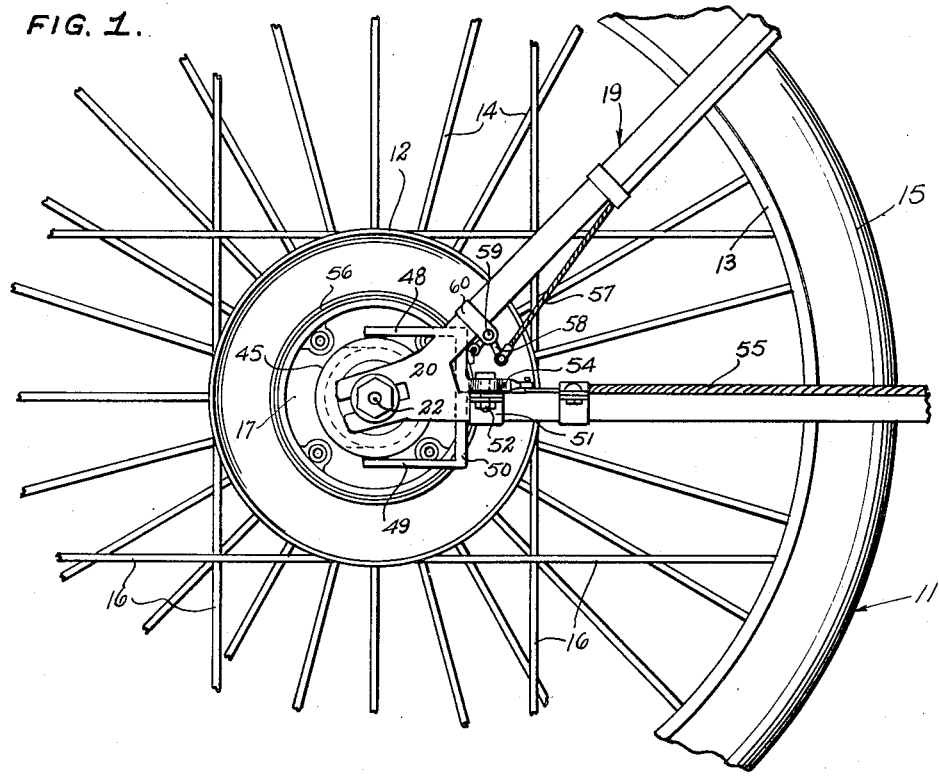
Figure 1 is a fragmentary elevational view of one side of a bicycle rear driving wheel provided with a geared transmission system constructed in accordance with the present invention.

Referring to the drawings, 11 designates a bicycle rear wheel said rear wheel comprising a hub casing 12 which is generally in the shape of a drum, the periphery thereof being connected to an outer rim 13 by a plurality of radial spokes 14, and a conventional tire 15 being mounted on said rim. The wheel is further braced by a plurality of tangential spokes 16 connecting the periphery of hub casing 12 to rim 13.

Secured to casing 12 is a hub 17 having a sleeve portion 18. Indicated at 19 is the lower rear portion of the bicycle frame, said rear portion being bifurcated in the usual manner and having arms 20 and 21 located at the opposite sides of the rear wheel. Secured to said arms 20, 21 is the rear axle 22. A suitable bearing 23 is provided on axle 22 adjacent arm 20 and a similar bearing 24 is provided on said axle adjacent arm 21.

Designated at 25 is a spider which is rotatably received within housing 12 and is formed with a sleeve portion 26 which is journaled with respect to axle 22 by means of roller bearings 27. Similar roller bearings 28 are provided between sleeve portion 18 and said axle.

Figure 2:
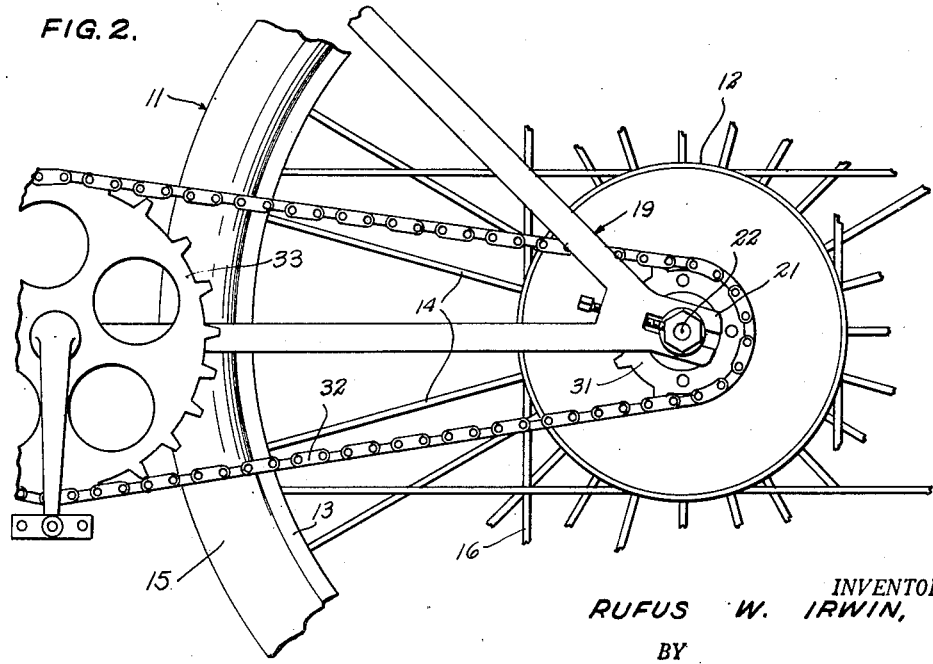
Figure 2 is a fragmentary elevational view of the opposite side of the bicycle wheel of Figure 1.

Keyed to the sleeve portion 26 and held in position thereon by a washer 29 encircling axle 22 and engaged by bearing 24 is a collar member 30. Secured to collar member 30 is a sprocket ring 31 which is coupled by a sprocket chain 32, to the pedal sprocket wheel 33 of the bicycle, as shown in Figure 2.

Secured to spider 25 at equal radial distances at opposite sides of axle 22 are headed studs 34 and 35 on which are journaled the respective stepped planet gear members 36 and 37. Gears 36 and 37 comprise stepped gears in that each has an inner set of radially outwardly directed teeth located concentrically of its axis and an outer set of radially outwardly directed teeth likewise concentric to the axis but which are radially outwardly offset relative to the inner set. The peripheral wall of casing 12 is formed with an internal orbit gear 38.

The planet gear members 36 and 37 are formed with an outer set of gear teeth 39 which are in mesh with said internal gear teeth 38. The gear members 36 and 37 are also formed with an inner set of gear teeth 40 on a substantially smaller radius than outer gear teeth 39. Encircling axle 22 and meshing with said inner set of gear teeth 40 is a generally annular floating sun gear 41 having three inwardly directed gear teeth 42 which are at substantially equal radial distances with respect to axle 22 as the minimum radial distances of the gear teeth 39 with respect to said axle.

Splined to axle 22 and axially slidable thereon is a sliding sun gear 43 formed at one end with gear teeth 44 adapted to mesh with either the inwardly directed teeth 42 of a floating sun gear 41, in the position shown in Figure 3, or with the outer set of teeth 39 of the planet gears 36 and 37, in an axially inwardly shifted position of said sliding sun gear 43. In the first position, floating sun gear 41 is locked against rotation relative to axle 22, and the rate of rotation of the gear members 36 and 37 with respect to that of spider 25 is relatively high. In the second position, wherein the outer set of teeth 39 of the gear members 36 and 37 are meshed with the gear teeth 44 of sliding sun gear 43, the rate of rotation of the gear members 36 and 37 is relatively low with respect to that of said spider 25.

In the first position of sliding sun gear 43 described above, when spider 25 is rotated the casing 12 is rotated at relatively high speed but with low torque. In the second position of said sliding sun gear the casing 12 rotates at a slower speed but with a high torque. It is therefore possible to shift gear ratios in accordance with loading requirements by moving sliding sun gear 43 axially on axle 22 between its first and second positions above described.

Slidably mounted on sleeve portion 18 is a peripherally grooved annular collar 45 to which are secured arms 46, 46 projecting parallel to axle 22 and slidably through apertures formed in hub 17. The inner ends of arms 46, 46 are secured to a collar 47 which is rotatably mounted in an annular groove formed in sleeve member 43. Engaged in the groove of collar 45 are inwardly extending projections carried by the respective upper and lower arms 48 and 49 of a yoke member 50. Yoke member 50 is pivoted at 52 for swinging movement around a vertical axis to a bracket 51 secured to the bicycle frame. A spring 53 connects yoke member 50 to the frame and biases the yoke member to an outwardly swung position, whereby the collar 45 acts to normally maintain sliding sun gear 43 in the position illustrated in Figure 3. In this position, as above explained, floating sun gear 41 is locked by the engagement of teeth 42 with the gear teeth 44 of the sliding sun gear 43, and the aforementioned high speed ratio is obtained.

Yoke member 50 is formed with an angled extension 54 to which is secured a cable 55. Cable 55 is connected to a suitable control lever, not shown, pivoted to the bicycle frame adjacent the handle bars of the bicycle or at any other suitable location within reach of the operator. When cable 55 is pulled by operating said control lever, yoke member 50 is swung clockwise, as viewed in Figure 7, moving collar 45 inwardly, and causing sliding sun gear 43 to be moved inwardly to the second position above described. This provides a low speed ratio with high torque at the rear wheel of the bicycle, and may be employed for starting the bicycle, for riding up steep inclines, or for other situations where heavy loading occurs.

Designated at 56 is a brake band which encircles the periphery of hub 17 and normally is in a released position with respect to said hub. The tension on the brake band may be increased by means of a control cable 57 connected to the brake band through a bent lever 58 pivoted at 59 to a bracket 60 secured to the bicycle frame. Control cable 57 is connected to a suitable control lever, not shown, located within reach of the operator on the bicycle frame.

It will be understood that in operation of the transmission system herein described, the axle 22 remains stationary with respect to the bicycle frame and that the planet gears 36 and 37 move in a circular path around said axle. In the first position above described, said planet gears travel around the periphery of floating sun gear 41 and transmit torque to casing 12 through the orbit gear 38. In the second position, said planet gears travel around the gear teeth 44 of sliding sun gear 43.

While a specific embodiment of a speed changing transmission system for bicycles and similar vehicles has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a wheeled vehicle, a non-rotatable axle secured to said vehicle, a spider journaled on said axle, driving means for rotating said spider on said axle, a wheel having a hub casing fixed thereto and rotatably receiving said spider therein, said hub casing being journaled on said axle, said casing being formed with an internal orbit gear around its inner circumference, a stepped planet gear journaled to said spider eccentrically of said axle, said planet gear having outer and inner sets of radially outwardly directed teeth, said outer set of teeth meshing with said orbit gear, whereby to drive said orbit gear, hub and wheel upon rotation of said planet gear, a sliding sun gear splined on said axle and slidable axially thereon, said sliding sun gear being formed with external gear teeth formed and arranged to be meshed at times with said outer set of teeth of said planet gear, a floating sun gear concentrically of said axle and including external teeth in constant mesh with said inner set of teeth of said planet gear, said floating sun gear being formed with internal teeth meshing at times with said teeth of said sliding sun gear and at times being out of mesh therewith, means for moving said sliding sun gear axially on said axle to and from meshing positions with said floating sun gear and with said outer set of teeth of said planet gear whereby to vary the speed of rotation of said orbit gear.

RUFUS W. IRWIN.

REFERENCES CITED

The following references are of record in the file of this patent:

UNITED STATES PATENTS

| Number | Name | Date |
|---|---|---|
| 521,133 | Bright | June 5, 1894 |
| 1,045,236 | Winkler | Nov. 26, 1912 |
| 1,091,606 | Vodoz | Mar. 31, 1914 |
| 1,417,798 | Cooke et al. | May 30, 1922 |
| 2,197,238 | Echenrode | Apr. 16, 1940 |

FOREIGN PATENTS

| Number | Country | Date |
|---|---|---|
| 27,158 | Great Britain | Nov. 26, 1912 |